(12) United States Patent
Wu et al.

(10) Patent No.: US 8,423,501 B2
(45) Date of Patent: Apr. 16, 2013

(54) DATA SOURCE FOR PARALLEL INFERENCE USING A SOURCE TABLE THAT IS PARTITIONED ON TRIPLE PREDICATE

(75) Inventors: Zhe Wu, Westford, MA (US); George Eadon, Hollis, NH (US); Vladimir Kolovski, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 685 days.

(21) Appl. No.: 12/622,466

(22) Filed: Nov. 20, 2009

(65) Prior Publication Data

US 2011/0125696 A1    May 26, 2011

(51) Int. Cl.
*G06F 17/00* (2006.01)

(52) U.S. Cl.
USPC .......................................................... 706/56

(58) Field of Classification Search .................... 706/12, 706/45, 62, 56
See application file for complete search history.

(56) References Cited

U.S. PATENT DOCUMENTS

2006/0235823 A1   10/2006   Chong et al.

OTHER PUBLICATIONS

Eiter et al., Rules and Ontologies for the Semantic Web, Sep. 2008, Reasoner Web, pp. 1-54.*
Horrocks, Ontologies and the Semantic Web, Dec. 2008, ACM, pp. 1-10.*
Soma et al., Parallel Inferencing for OWL Knowledge Bases, Sep. 2008, ICPP, pp. 1-8.*
Agrawal, et al., Direct Algorithms for Computing the Transitive Closure of Database Relations, Proceedings of the 13th VLDB Conference, Brighton 1987, pp. 255-266.
Dong, et al., Maintaining Transitive Closure of Graphs in SQL, pp. 1-23, Intl. Journal of Information Technology, 5 (1): (1999).
Ioannidis, Yannis E., On the Computation of the Transitive Closure of Relational Operators, Proceedings of the Twelfth International Conference on Very Large Data Bases, Kyoto, Japan, Aug. 1986, pp. 403-411.
Pang, et al., Incremental Maintenance of Shortest Distance and Transitive Closure in First-Order Logic and SQL, ACM Transactions on Database Systems, vol. 30, No. 3, Sep. 2005, pp. 698-721.
Wu, et al., Implementing an Inference Engine for RDFS/OWL Constructs and User-Defined Rules in Oracle, pp. 1239-1248, 2008, IEEE 24th International Conference on Data Engineering, 2008.

* cited by examiner

*Primary Examiner* — David Vincent
(74) *Attorney, Agent, or Firm* — Kraguljac Law Group LLC

(57) ABSTRACT

Systems, methods, and other embodiments associated with data sources adapted for parallel inference on triples associated with a semantic model are described. One example method includes creating a source table that stores triples for entailment in a manner that is adapted for parallel inference. The source table may be partitioned by triple predicate or may store compact triple identifiers that have been mapped to triple identifiers from the semantic model.

16 Claims, 7 Drawing Sheets

DATA SOURCE FOR PARALLEL INFERENCE USING A SOURCE TABLE THAT IS PARTITIONED ON TRIPLE PREDICATE

BACKGROUND

The evolution of the web to a semantic web is gaining momentum. Resource Description Framework (RDF) is being widely adopted as a standard to capture the semantics of data. Facts represented as RDF (subject, predicate, object) triples can capture both relationships between resources as well as attribute values associated with a resource. A unique challenge of semantic data stores is the ability to automatically derive additional facts based on facts already asserted in the semantic model. These additional facts are derived using inference rules that model the knowledge contained in the existing facts in a process called entailment. With large semantic data models, firing the inference rules to generate inferred triples is a processor-intense and time consuming process. For example, using a typical PC with 2.4 GHz processor, 8 GB main memory and 3 TB in disk memory, firing approximately 50 inference rules to entail the LUBM8000 ontology, a benchmark that includes more than a billion triples, results in about 42 hours of processing time using Oracle Database 11.1.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1A:
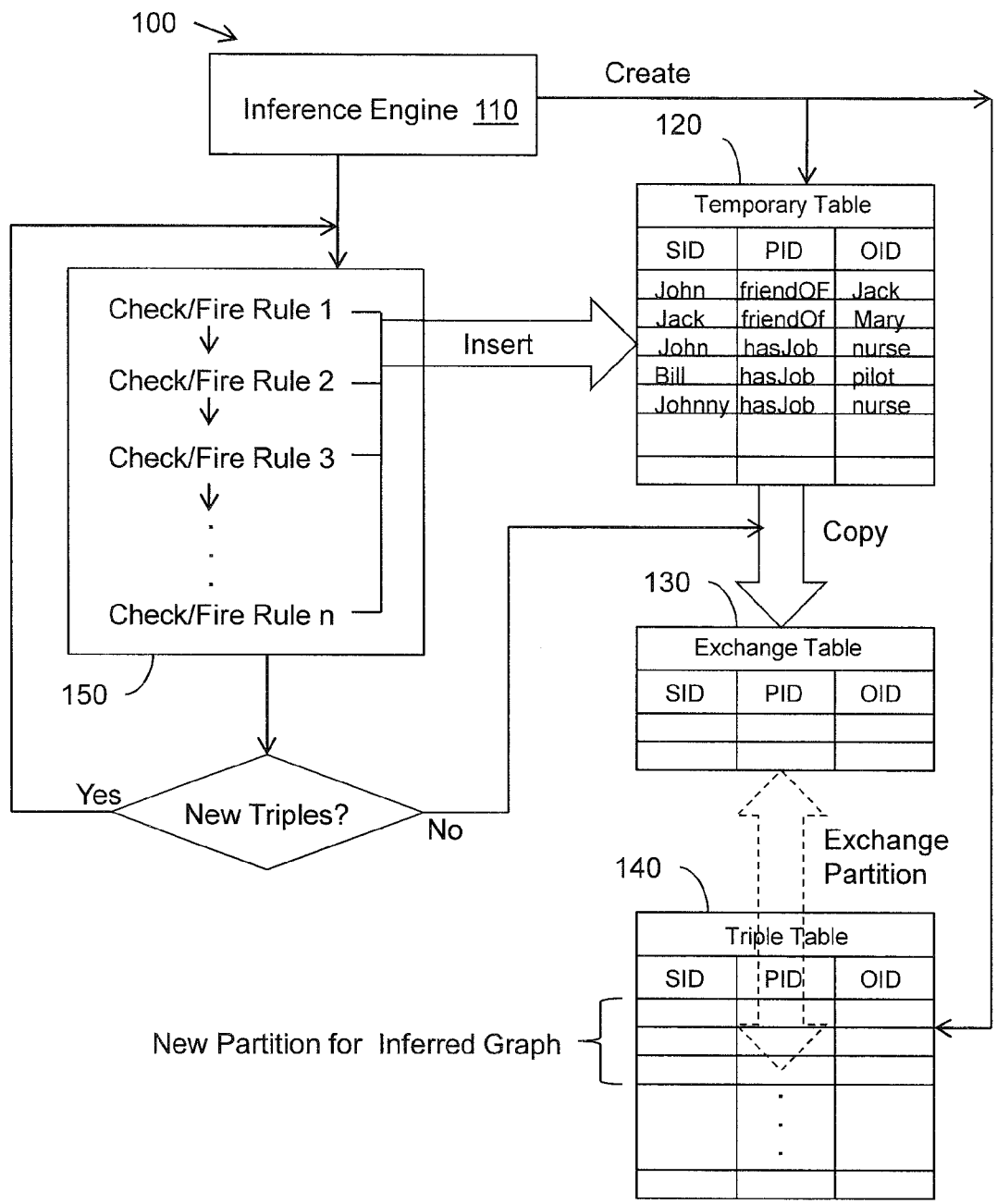
FIG. 1A illustrates an example embodiment of a system associated with serial inference.

The entailment of a semantic data model involves firing a set of inference rules on triples in the semantic data model to generate inferred triples. The rules are typically executed on a semantic model table that stores the triples associated with one or more semantic models. The semantic model table is usually partitioned by semantic model. Even when efforts are made to reduce the number of inference rules, the entailment process is time consuming and requires large quantities of memory.

As part of the OWL 2 standardization effort led by the W3C, less expressive OWL rule subsets have been proposed that have polynomial complexity and are suitable for efficient and scalable reasoning over large datasets. One of these OWL subsets is OWL 2 RL, which is a rule-based profile of OWL 2. Since it is described as a collection of positive Datalog rules, OWL 2 RL can be theoretically implemented on top of semantic stores that already provide rule-based reasoning. OWL 2 RL includes a subset of inference rules that have been used in other models and also provides the capability for a user to add custom rules. These rules include RDF constructs, inverse and functional properties, existential and value restrictions, and owl:intersectionOf.

One example technique for implementing an inference engine on such semantic data models is to pre-compute and materialize inferred triples using forward chaining, and later use the materialized view for query answering. The forward chaining approach repeatedly fires inference rules on the corpus of asserted and inferred triples in the materialized view until no new facts can be inferred. Other inference techniques apply inference rules at the time of query, which, while saving the memory used in generating inferred triples a priori, can significantly slow query response time. While the pre-computing and materializing of inferred triples will be discussed in the examples herein, it is to be understood that the methods and systems described herein may be applied to any inference technique that involves entailment of a semantic data model by applying inference rules to a corpus of triples in the semantic data model.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software stored as computer executable instructions on a computer-readable medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., SQL (structured query language), an OQL (object query language), a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

FIG. 1A is a functional block diagram that outlines one example embodiment of an entailment process 100. An inference engine 110 is used to fire a set of inference rules 150 on triples in a semantic data model to create inferred triples. The entailment outlined in FIG. 1 reflects a forward-chaining strategy. The inference process starts with the creation of a new partition in a triple table 140 that stores a materialized view of the subject (SID), property (PID), and object (OID) components of triples in the data model. The new partition will ultimately store the inferred graph (set of inferred triples) that results from the entailment process. A temporary table 120 is also created by the inference engine 110. Like the triple table 140, the temporary table has three columns, SID, PID, OID that together store a triple. The temporary table 120 is typically partitioned on the PID (triple predicate). When ancillary information is to be generated by entailment, the temporary table may have additional DISTANCE or PROOF columns.

The core inference logic is driven by the set of inference rules 150. Conceptually, each rule will be executed (fired) during inference and only new (previously nonexistent) triples are added into the temporary table. The rules are initially executed on a semantic model table (not shown) that holds data for one or more semantic models. The semantic model table is typically partitioned on a model identifier. To execute a rule, matched triples of each antecedent are located and joined based on common variables to produce corresponding consequent triples. For example, a rule that specifies that if a class U is a subclass of X and a resource V of type U, then V is also of type X would be expressed as part of a semantic model in OWL as follows:

| U rdfs:subClassOf X. | V rdf:type U | → V rdf:type X |

A translation of this rule into SQL would be as follows. The presence of two antecedent patterns translates into a 2-way self-join on <IVIEW>, which is an inline view representing the union of triples in the semantic model and newly inferred triples in the temporary table 120. The single common variable U that connects the two triple patterns in the antecedent provides the join condition T1.SID=T2.OID. The NOT EXISTS clause filters out triples already present in <IVIEW>.

```
select distinct T2.SID sid, ID(rdf:type) pid, T1.OID oid
    from <IVIEW> T1, <IVIEW> T2
where T1.PID = ID(rdfs:subClassOf)
    and T2.PID = ID(rdf:type) and T1.SID = T2.OID
    and NOT EXISTS (select 1 from <IVIEW> m
        where m.SID = T2.SID and m.PID = ID(rdf:type) and
        m.OID = T1.OID)
```

The SELECT list is formed based upon the triple pattern in the consequent of the rule. The triples returned by the SELECT statement are inserted using an INSERT AS SELECT into the temporary table. Note that the ID( ) function invocations will be replaced with the actual integer IDs to avoid execution time overhead.

In one pass, all rules will be examined; and if no rule generates any new triples, the inference process terminates. All triples from the temporary table 120 are copied into an exchange table 130 that has exactly the same structure as the triple table 140. The exchange table is indexed and exchanged into the newly created partition in the triple table 140. The exchange operation is a virtually zero-time operation because it involves only updating metadata of the tables.

Figure 1B:
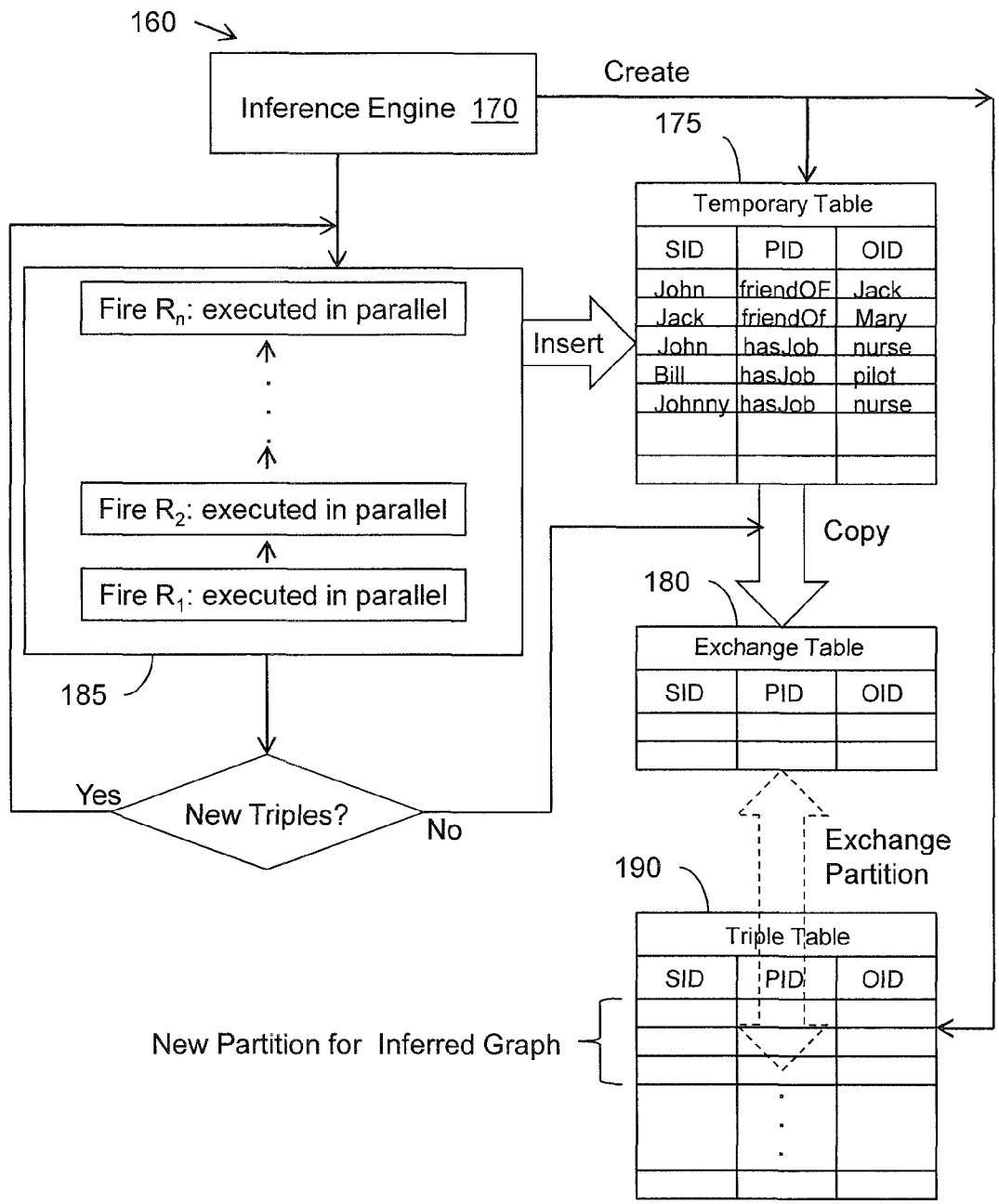
FIG. 1B illustrates an example embodiment of a system associated with parallel inference.

FIG. 1B is a functional block diagram that outlines an adaptation of the entailment process shown in FIG. 1A. In the entailment process 160 shown in FIG. 1B, each of the n inference rules 185 is broken into components that are executed in parallel. As with the system outlined in FIG. 1A, an inference engine 170 is used to fire the inference rules 185 on triples in a semantic data table (not shown), which is partitioned on model identifier, to create inferred triples. The inference process starts with the creation of a new partition in a triple table 190 that stores a materialized view of the subject (SID), property (PID), and object (OID) components of triples in the data model. The new partition will ultimately store the inferred graph (set of inferred triples) that results from the entailment process. A temporary table 175, which is partitioned on triple predicate, is also created by the inference engine 160. Like the triple table 190, the temporary table has three columns, SID, PID, OID that together represent a triple.

The set of inference rules are executed on the semantic data model table by executing the component inference rules for each inference rule in parallel. In one pass, all rules will be examined; and if no rule generates any new triples, the inference process terminates. All triples from the temporary table 120 are copied into an exchange table 130 that has exactly the same structure as the triple table 140. The exchange table is indexed and exchanged into the newly created partition in the triple table 140. Surprisingly, simply executing the inference rules in parallel on data in the semantic data model has not been shown to provide the improved performance that would be expected. Storing the triples from the semantic model in a data source that is adapted for parallel inference and executing the inference rules, in parallel, on the data source (rather than the semantic model table) may improve performance during entailment.

Figure 2:
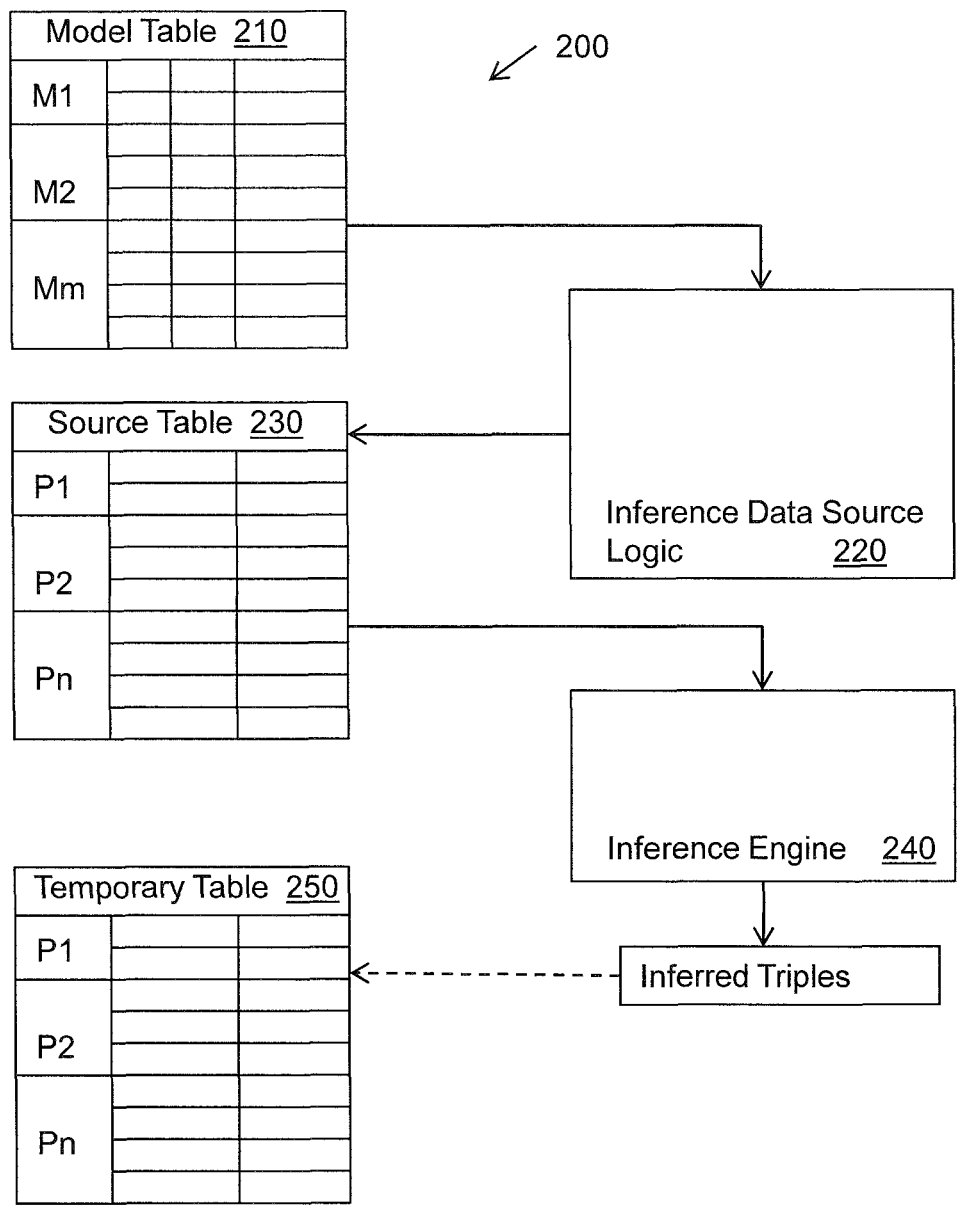
FIG. 2 illustrates an example embodiment of a system associated with parallel inference.

FIG. 2 illustrates an example embodiment of a computing system 200 that performs entailment on triples associated with number m of semantic models and stored in a model table 210. The model table 210 is partitioned on a semantic model identifier. The system 200 includes an inference data source logic 220 that creates a source table 230 to store the triples in a manner that is adapted for parallel inference. Of course, it will be appreciated that the source table 230 may also be used with systems that perform serial inference.

The source table 230 is partitioned on triple predicate and as such has one partition for each of n predicates. In a typical semantic model, the number of unique predicates is much smaller than the number of unique subjects/objects. In one example embodiment, the inference data source logic 220 creates the source table 230 using hash partitioning as follows.

```
create table<source_table_name> (predicate_id, object_id,
    subject_id)
        partition by hash(predicate_id)
as
    select * from (
        select predicate_id, object_id, subject_id from <MODEL1>
        UNION ALL
        select predicate_id, object_id, subject_id from <MODEL2>
        UNION ALL....
            select predicate_id, object_id, subject_id from
            <MODELm>
);
```

List partitioning may be used if the set of predicates is known at the time of source table creation. An inference engine 240 executes inference rules in parallel on the source table 230 to perform entailment of the semantic model. Inferred triples are stored in a temporary table 250, which is also partitioned on triple predicate.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
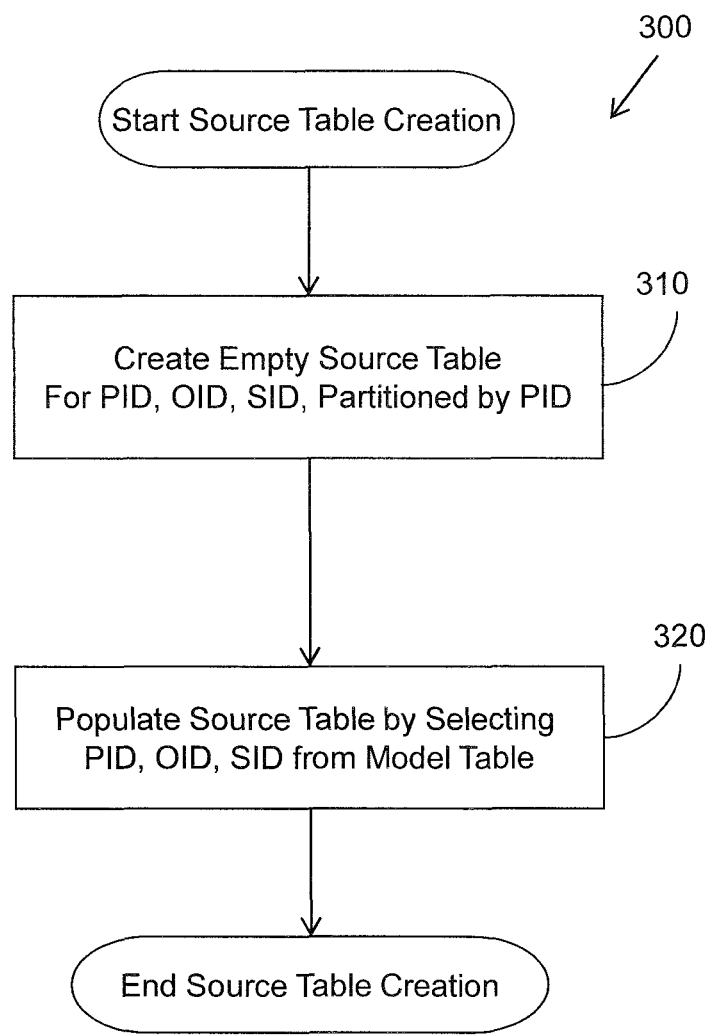
FIG. 3 illustrates an example embodiment of a method associated with parallel inference.

FIG. 3 illustrates an example embodiment of a method 300 that creates a source table that is adapted for parallel inference. At 310, an empty source table is created that includes columns for a triple predicate identifier (PID), a triple object identifier (OID), and a triple subject identifier (SID). The source table is partitioned on predicate identifier. At 320, the method performs a selection of all the triples from all the relevant semantic models in the model table.

While FIG. 3 illustrates various actions occurring in serial, it is to be appreciated that various actions illustrated in FIG. 3 could occur substantially in parallel. By way of illustration, a first process could create an empty source table and a second process could populate the source table. While two processes are described, it is to be appreciated that a greater and/or lesser number of processes could be employed and that lightweight processes, regular processes, threads, and other approaches could be employed.

Figure 4:
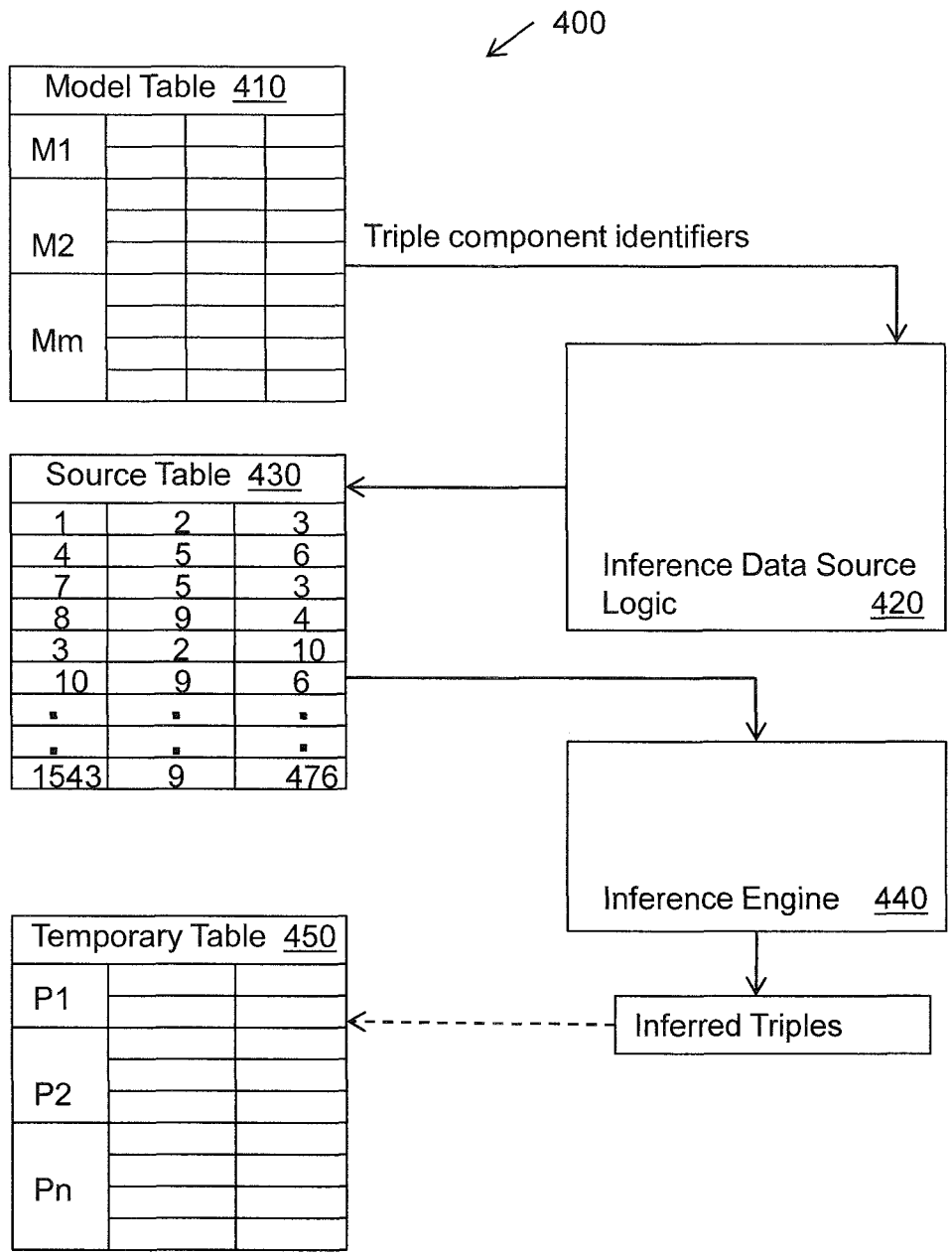
FIG. 4 illustrates an example embodiment of a system associated with parallel inference.

FIG. 4 illustrates an example embodiment of a computing system 400 that performs entailment on triples associated with number m of semantic models and stored in a model table 410. The model table 410 includes columns that store identifiers of triple components. To provide a more compact data source for parallel inference the system includes a inference data source logic 420 that maps triple identifiers from the model table 410 to compact identifiers that require less storage and stores the compact identifiers in a source table 430. An inference engine 440 executes inference rules in parallel on the source table 430 to perform entailment of the semantic model. Inferred triples are stored in a temporary table 450, which also stores compact identifiers. Using more compact identifiers reduces the amount of space needed to store and manipulate triples, improving performance during parallel inference. Of course, it will be appreciated that the compact identifiers may also be used with systems that perform serial inference.

In one example embodiment, the compact identifier logic sets the column type for the source table to an 8-byte binary RAW type that is large enough to hold hashed component identifiers. The URIs, literals, and blank nodes in the model table 410 may be hashed into 8 byte integer IDs for storage in the temporary table (175 in FIG. 2) and triple table (190 in FIG. 2). However, the mapped integer IDs tend to be sparse so that, even with this improvement, the temporary table and triple table may still consume more memory than necessary.

In another example embodiment, the compact identifier logic sequentially maps the triple component identifiers to a compact identifier comprising a unique integer value. Perfect reverse hashing is one way to sequentially map the triple component identifiers to compact identifiers. The inference data source logic determines a minimum column width necessary to store a largest of the compact identifiers and stores the compact identifiers in a source table having the determined column width, thereby minimizing the size of the source table.

Figure 5:
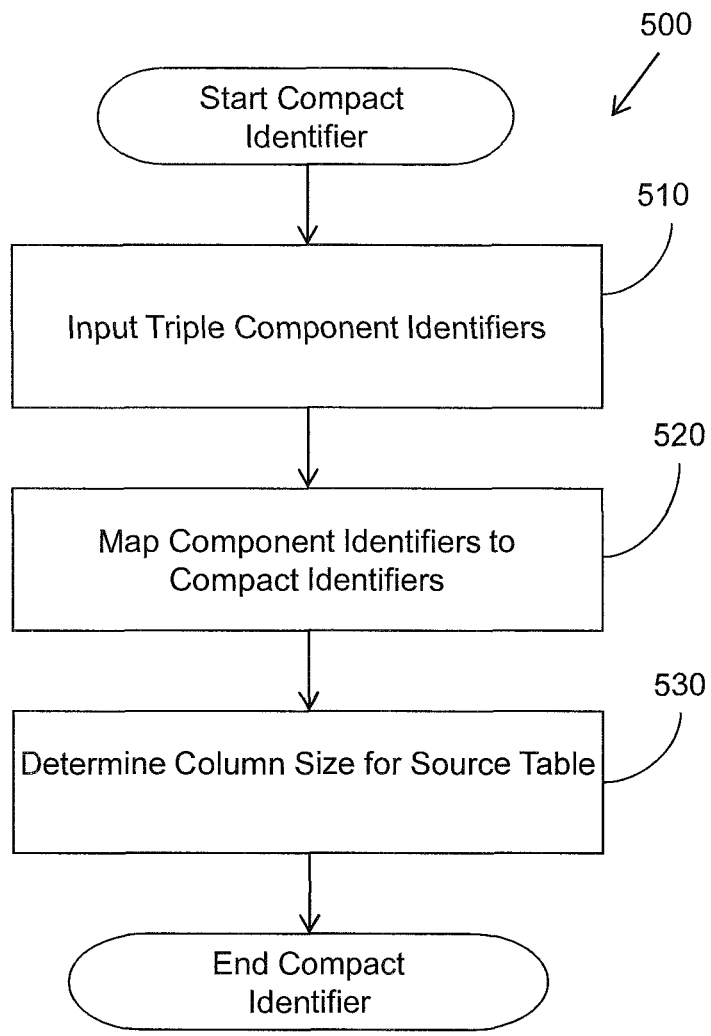
FIG. 5 illustrates an example embodiment of a method associated with parallel inference.

FIG. 5 illustrates an example embodiment of a method 500 that generates compact identifiers for triple component identifiers stored in a semantic model table. At 510 the triple component identifiers are input. At 520, the component identifiers are mapped to compact identifiers. The mapping performed at 520 may include sequentially mapping the triple component identifiers to a compact identifier comprising a unique integer value. At 530 a column size is determined for the source table based on a number of bytes necessary to store a largest of the compact identifiers.

While FIG. 5 illustrates various actions occurring in serial, it is to be appreciated that various actions illustrated in FIG. 5 could occur substantially in parallel. By way of illustration, a first process could map the component identifiers to compact identifiers and another process could create an empty source table have the proper column width. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes accessing a set of triples and inference rules associated with a semantic model; creating a source table that is adapted for parallel inference to store the set of triples for entailment; storing the set of triples in a the source table; firing the inference rules in parallel on the triples in the source table to generate inferred triples associated with the semantic model. While executable instructions associated with the above method are described as being stored on a computer-readable medium, it is to be appreciated that executable instructions associated with other example methods described herein may also be stored on a computer-readable medium.

Figure 6:
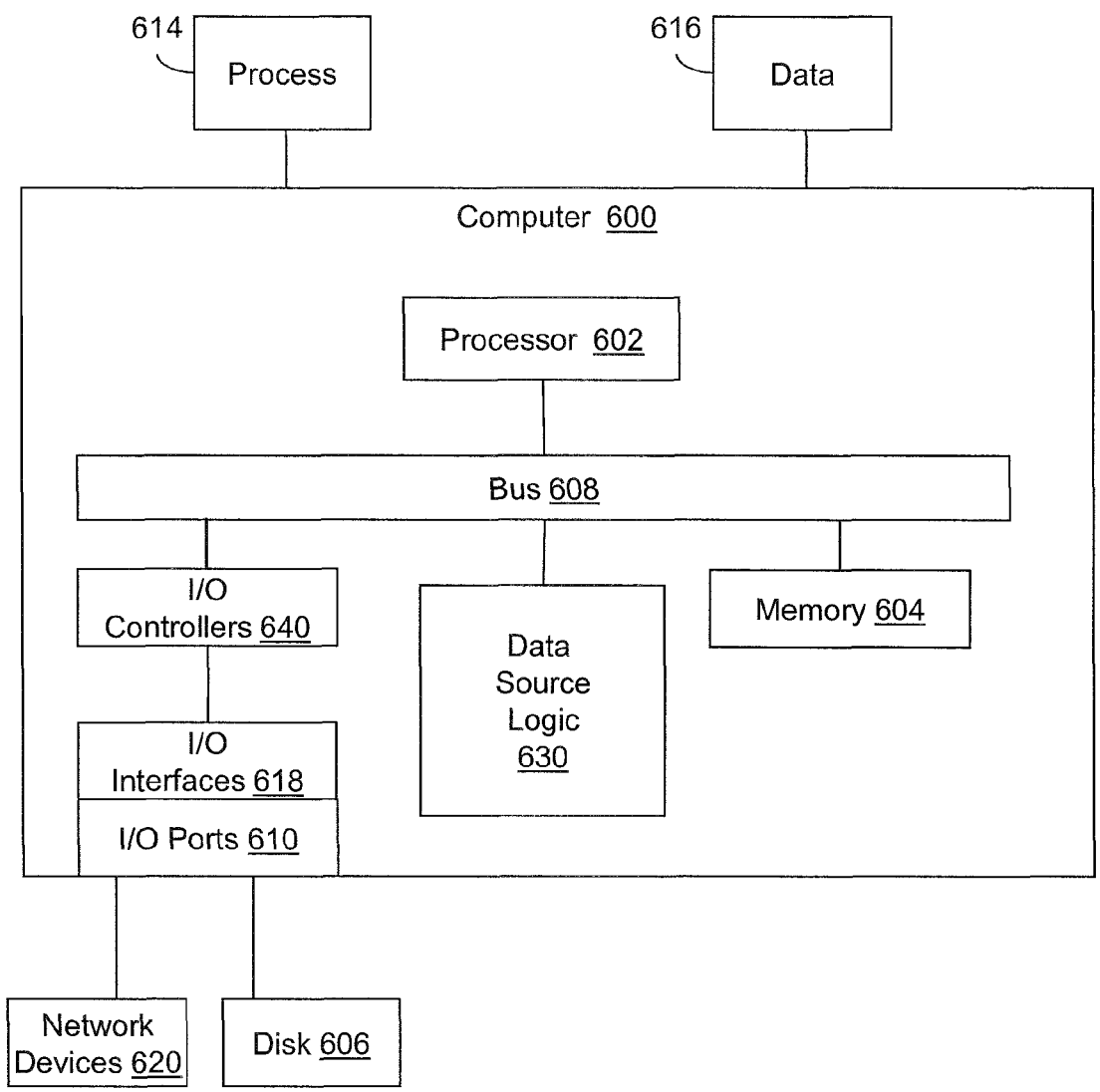
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a data source logic 630 configured to facilitate incremental inference. In different examples, the logic 630 may be implemented in hardware, software stored as computer executable instructions on a computer-readable medium, firmware, and/or combinations thereof. While the logic 630 is illustrated as a hardware component attached to the bus 608, it is to be appreciated that in one example, the logic 630 could be implemented in the processor 602.

Thus, logic 630 may provide means (e.g., hardware, software stored as computer executable instructions on a computer-readable medium, firmware) for storing at least one semantic model comprising one or more inference rules and a set of triples associated with the model; means (e.g., hardware, software stored as computer executable instructions on a computer-readable medium, firmware) for creating a data source that stores the triples in a manner adapted for parallel inference; and means (e.g., hardware, software stored as computer executable instructions on a computer-readable medium, firmware) for firing the inference rules, in parallel, on the data source to create inferred triples associated with the semantic model.

The means may be implemented, for example, as an ASIC (application specific integrated circuit) programmed to apply a hybrid approach to equivalence reasoning. The means may also be implemented as computer executable instructions that are presented to computer 600 as data 616 that are temporarily stored in memory 604 and then executed by processor 602.

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, ROM (read only memory), PROM (programmable ROM), and so on. Volatile memory may include, for example, RAM (random access memory), SRAM (synchronous RAM), DRAM (dynamic RAM), and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM (compact disk) drive, a CD-R (CD recordable) drive, a CD-RW (CD rewriteable) drive, a DVD (digital versatile disk and/or digital video disk) ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCI (peripheral component interconnect), PCIE (PCI express), 1394, USB (universal serial bus), Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN (local area network), a WAN (wide area network), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A computer-implemented method, comprising:
    accessing a set of triples and inference rules associated with a semantic model, where triples in the set of triples include a triple predicate;
    storing the set of triples in a source table that is partitioned on triple predicate and is adapted for parallel inference; and
    providing the source table to an inference engine that fires the inference rules in parallel on the triples in the source table to generate inferred triples associated with the semantic model.

2. The computer-implemented method of claim 1 where the source table is created by performing a union of selection operations on all triples associated with one or more semantic models.

3. The computer-implemented method of claim 2 where the source table is partitioned by a predicate identifier.

4. The computer-implemented method of claim 1 where the storing of triples in the source table is performed by mapping triple component identifiers associated with triples in the set of triples to a set of compact identifiers that require less storage space than a triple component identifier in the set of triples that requires the most storage space and storing the compact identifiers in the data source.

5. The computer-implemented method of claim 4 where the mapping is performed by sequentially mapping the triple component identifiers to a compact identifier comprising a unique integer value.

6. The computer-implemented method of claim 4 comprising determining a minimum column width necessary to store a largest of the compact identifiers and storing the compact identifiers in a source table having the determined column width.

7. The computer-implemented method of claim 4 where the mapping is performed by using perfect reverse hashing to map hashed triple component identifiers to a sequential set of integer values.

8. A computing system comprising:
    data storage that stores at least one semantic model comprising one or more inference rules and a set of triples associated with the model;
    an inference data source logic that creates a source table partitioned on triple predicate and stores the triples in the source table in a manner adapted for parallel inference; and
    an inference engine that fires the inference rules, in parallel, on the source table to create inferred triples associated with the semantic model.

9. The computing system of claim 8 where the inference data source logic creates the source table by performing a query on one or more semantic models that selects all triples associated with the one or more semantic models and performing a union operation on the returned triples.

10. The computing system of claim 8 where the inference data source logic creates a data source adapted for parallel inference by mapping triple component identifiers for the triples associated with the semantic model to a set of compact identifiers that require less storage space than a triple component identifier in the set of triples that requires the most storage space and storing the compact identifiers in the data source.

11. The computing system of claim 10 where inference data source logic sequentially maps the triple component identifiers to a compact identifier comprising a unique integer value.

12. The computing system of claim 10 where the inference data source logic determines a minimum column width necessary to store a largest of the compact identifiers and stores the compact identifiers in a source table having the determined column width.

13. A non-transitory computer-readable medium storing computer executable instructions that when executed by a computer cause the computer to perform a method, the method comprising:
    accessing a set of triples and inference rules associated with a semantic model, where a triple includes a predicate component;
    creating a source table to store the set of triples for entailment, where the source table is partitioned on the predicate component and is adapted for parallel inference;
    storing the set of triples in the source table; and
    firing the inference rules in parallel on the triples in the source table to generate inferred triples associated with the semantic model.

14. The non-transitory computer-readable medium of claim 13, the instructions comprising performing a union of selection operations on all triples associated with one or more semantic models to create the source table.

15. The non-transitory computer-readable medium of claim 13, the instructions comprising sequentially mapping triple component identifiers associated with the triples to a compact identifier comprising a unique integer value.

16. The non-transitory computer-readable medium of claim 15, the instructions comprising determining a minimum column width necessary to store a largest of the compact identifiers and creating a source table having the determined column width.

* * * * *

UNITED STATES PATENT AND TRADEMARK OFFICE
CERTIFICATE OF CORRECTION

| | |
|---|---|
| PATENT NO. | : 8,423,501 B2 |
| APPLICATION NO. | : 12/622466 |
| DATED | : April 16, 2013 |
| INVENTOR(S) | : Wu et al. |

It is certified that error appears in the above-identified patent and that said Letters Patent is hereby corrected as shown below:

In the Specification:

In column 6, line 39-40, delete "a inference" and insert -- an inference --, therefor.

In column 7, line 33, delete "a the" and insert -- a --, therefor.

Signed and Sealed this
Sixth Day of August, 2013

Teresa Stanek Rea
*Acting Director of the United States Patent and Trademark Office*